June 10, 1958     I. F. ANDERSON ET AL     2,838,134
PRODUCTION OF ACRYLONITRILE FROM HYDROCYANIC
ACID AND ACETYLENE
Filed March 15, 1957
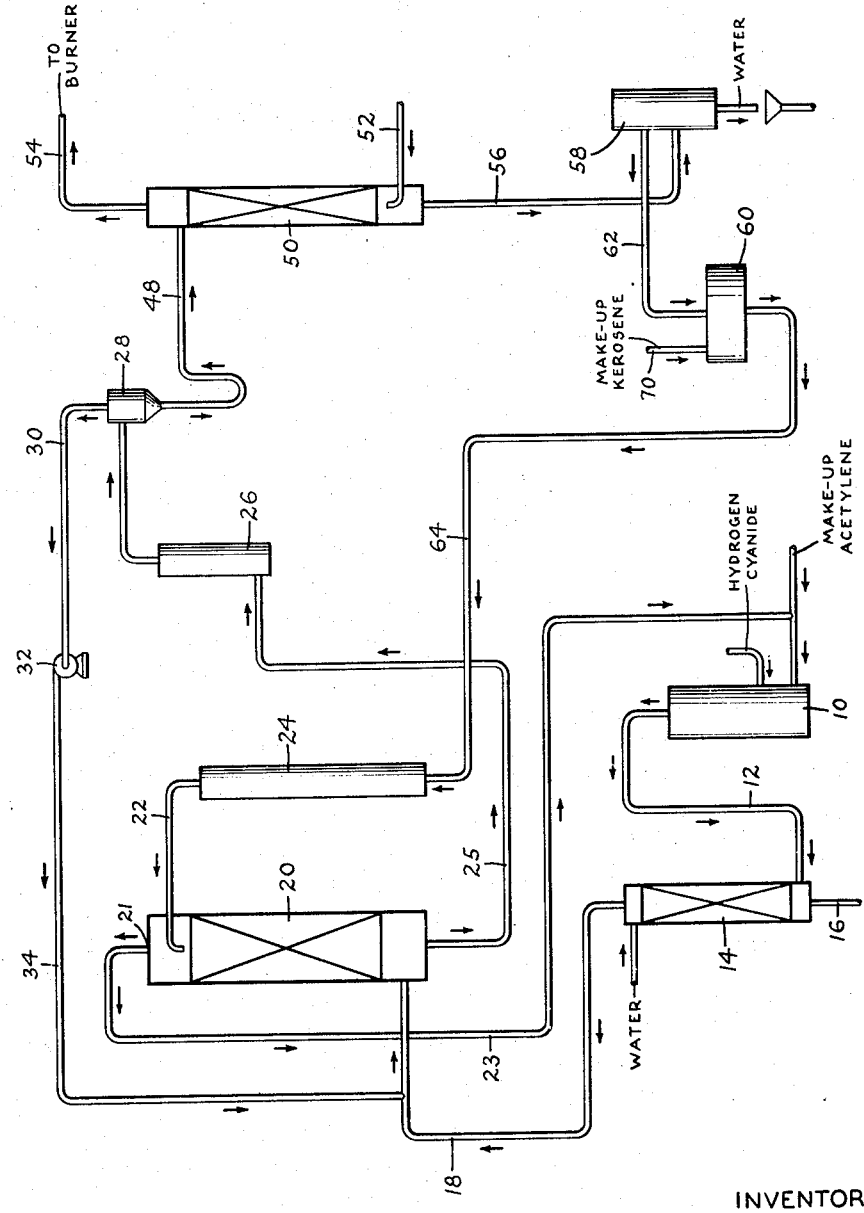
INVENTORS
IRVING F. ANDERSON
ROBERT F. BUTLER
BY
ATTORNEY United States Patent Office 2,838,134
Patented June 10, 1958

2,838,134

PRODUCTION OF ACRYLONITRILE FROM HYDROCYANIC ACID AND ACETYLENE

Irving F. Anderson, Chesterfield County, and Robert F. Butler, Hopewell, Va., assignors to Allied Chemical & Dye Corporation, New York, N. Y., a corporation of New York Application March 15, 1957, Serial No. 646,474

5 Claims. (Cl. 183—115)

This invention relates to a process for the preparation of acrylonitrile from HCN and acetylene. More particularly, it relates to a step in the process which permits the separation of monovinylacetylene from the recycled acetylene without significant loss of acetylene.

In the preparation of acrylonitrile from HCN and acetylene in the presence of an aqueous solution of cuprous salt, it is recognized that a considerable amount of monovinylacetylene is formed which in turn may form divinylacetylene if it is not removed from the acetylene gases which are recycled to the reactor. The divinylacetylene if formed is detrimental to the process in that it complicates acrylonitrile purification and further gives rise to polymerization products which shorten the life of the catalyst. For this reason many of the processes of the prior art have provided some means for removing the monovinylacetylene from the acetylene gases prior to recycling them to the reactor. In most instances the gases leaving the reactor are sent through a column containing an absorbent for the purpose of removing the monovinylacetylene. The absorbent becomes exhausted after a fixed period of time and must then be regenerated. While this procedure successfully removes the monovinylacetylene, a considerable amount of acetylene is lost in the absorbent. In some processes of the prior art using this technique, this loss equals 8 or more percent of the acetylene consumed in the process. For this reason, it was proposed in other prior art to dissolve the gases in a solvent such as mineral oil saturated with sulfur from which the acetylene could be effectively separated from the monovinylacetylene by passing the solvent containing the dissolved material through a rectification column. This is, of course, expensive not only from the point of view of the equipment used but also in that the operation is costly. Furthermore, polymer formation in such columns is also a problem.

It is an object of this invention to provide an improved process by means of which monovinylacetylene can be separated from recycled acetylene without significant loss of acetylene.

It is a further object of this invention to provide an improved process in accordance with which it is possible to separate the monovinylacetylene from the acetylene in an economic manner.

It has been found that these and other advantages incidental thereto can be obtained by scrubbing the monovinylacetylene from the acetylene-rich recycle gas with kerosene, flashing the spent kerosene at low temperatures and pressure in a long tube evaporator to recover a major portion of the dissolved acetylene with only a small amount of monovinylacetylene, and then stripping the kerosene of monovinylacetylene with steam and thus obtaining both the acetylene and the kerosene in usable form for recycling without a significant loss of either.

The drawing illustrates a simplified flow sheet showing the steps involved in a preferred example of the process of this invention. In accordance with the process therein shown, acetylene and hydrogen cyanide are fed to reactor 10 containing an aqueous solution of a cuprous salt catalyst. The HCN can be fed to the reactor as a liquid or as a gas. The effluent vapors from the reactor passing through line 12 are introduced into the base of a scrubber column 14 where acrylonitrile and other water-soluble products are removed at 16. The residual acetylene-rich gas mixture containing monovinylacetylene leaves column 14 via line 18 and enters the monovinylacetylene absorber 20. The monovinylacetylene absorber shown is a packed column where the gas is countercurrently extracted with kerosene entering via line 22 from cooler 24. Temperature in the monovinylacetylene absorber is kept between $-20$ and $+40°$ C., preferably within the range of 0 to $+15°$ C. The preferred temperature range gives optimum monovinylacetylene removal consistent with low refrigeration cost. The pressure in the monovinylacetylene absorber is preferably about atmospheric but the absorber is operable at pressure lying within the range of 0.75–2.4 atmospheres (abs.).

Spent kerosene containing by weight 0.4–0.6% monovinylacetylene and 0.2 to 0.35% acetylene leaves the absorber and passes to the flasher 26 via line 25 while gases leaving the absorber at 21 are recycled to the reactor 10 via line 23. The flasher shown is a once-through, long-tube type evaporator with a separator 28. The pressure in the flasher and separator is preferably correlated with the pressure of the monovinylacetylene absorber so that the pressure is substantially less than that to be found in the absorber. Thus, as the pressure in the absorber is increased from 0.75–2.4 atmospheres, the corresponding pressure in the flasher and separator is increased from 0.15–1.25 atmospheres. The vapor from separator 28 contains from 70–80%, usually 73–76% of the acetylene fed to the flasher and 4–6%, usually 5–5.5% of the monovinylacetylene feed. The acetylene-enriched gas leaving the separator through line 30 is fed to a compressor 32 and recycled to the inlet of the monovinylacetylene absorber 20 via line 34. The liquid from the separator is sent via line 48 to the kerosene stripper 50.

The kerosene stripper 50 illustrated is preferably a packed column where the kerosene is prepared for recycling by treatment with steam admitted through line 52. Temperature is normally held at about 100° C. throughout the stripping column when pressure is about atmospheric. Vapors leaving the stripper pass through line 54 to a burner. The purified kerosene from the steam stripper is passed through line 56, separated from water in decanter 58 and sent to storage 60 via line 62. If additional kerosene is required in the system it may be added to the storage tank 60 as indicated at 70. The kerosene may then be taken from storage and recycled to the cooler 24 via line 64.

*Example of the Process*

The gases from the acrylonitrile scrubber at 40° C. and 1 p. s. i. g. contain by volume 92% $C_2H_2$, 1.6% MVA (monovinylacetylene) and the balance water:

| | Vol. units |
|---|---|
| $C_2H_2$ | 608.07 |
| MVA | 10.62 |
| ACN | 0.44 |
| $H_2O$ | 42.12 |

These gases pass to the monovinylacetylene absorber operating at 0–10° C. and 1.1 atmospheres (abs.) wherein 99.2% of the monovinylacetylene is removed by a countercurrent stream of kerosene. About 8% of the acetylene used as makeup in the overall acrylonitrile process is also dissolved in the kerosene. The gases exit the absorber, containing approximately 99% $C_2H_2$ and about 1% $H_2O$, are recycled to the acrylonitrile (ACN) reactor. For example:

| | Vol. units |
|---|---|
| $C_2H_2$ | 604.89 |
| MVA | 0.07 |
| ACN | 0.44 |
| $H_2O$ | 5.22 |

The kerosene steam from the absorber, containing, by weight, 0.45% monovinylacetylene, 0.26% $C_2H_2$ is flashed at 10° C. and 0.25 atm. (abs.) in the acetylene flasher and separator. The vapor from the separator, which contains 74.8% of the $C_2H_2$ fed to the flasher and 5.2% of the monovinylacetylene fed, is compressed and recycled to the absorber. The liquid from the separator at 10° C. is heated to 80° C. and fed to the kerosene stripper. The feed to this stripper contains by weight 0.43% MVA and 0.066% $C_2H_2$. The stripper is operated at 100° C. at atmospheric pressure. Steam is used to strip out 99.0–99.9% of the monovinylacetylene. The stripped vapor from this column, containing, by volume 4.6% $C_2H_2$, 15.4% MVA, 0.8% kerosene and the balance water, is sent to a burner. The stripped bottoms, containing, by weight, 2.7% $H_2O$ and the balance kerosene, are cooled from 100° C. to 31° C. and decanted. The water phase is sent to the sewer, and the kerosene phase after make-up is recycled to the cooler, thence to the MVA absorber. (Only 0.08% of the kerosene is lost per pass in this operation.)

The kerosene clean-up of the recycle gas is principally valuable in lengthening the catalyst's effective life. Studies have shown that when recycle bleed is employed as a means of controlling monovinylacetylene concentration in the recycled gas, catalyst productivity dropped to 30% of the initial value in 100 hours. In contrast thereto when kerosene was used for the absorption of monovinylacetylene catalyst productivity showed no drop after 230 hours of operation.

The overall advantages of the process are therefore readily apparent in the remarkable beneficial effect it has on catalyst effective life and the economic advantages attainable by the inclusion of the acetylene recovery from the kerosene used in separating the monovinylacetylene from the acetylene.

While the above description submitted herewith discloses a preferred and practical embodiment of the production of acrylonitrile from hydrocyanic acid and acetylene in accordance with the invention, it will be understood that the specific details described are by way of illustration and are not to be construed as limiting the scope of the invention.

We claim:
1. In a process for preparing acrylonitrile from hydrogen cyanide and acetylene, the steps comprising scrubbing monovinylacetylene from acetylene-rich recycle gas with kerosene, flashing the spent kerosene at low temperature and pressure to recover a major portion of the dissolved acetylene, and subsequently stripping the kerosene of monovinylacetylene with steam.

2. In a process for preparing acrylonitrile from hydrogen cyanide and acetylene, the steps comprising scrubbing monovinylacetylene from acetylene-rich recycle gas with kerosene in an absorption tower operating at a temperature between −20 and +40° C. at a pressure of 0.75–2.4 atmospheres, flashing the spent kerosene at low temperatures and a pressure below that of the absorber within the range 0.15–1.25 atmospheres to recover a major portion of the dissolved acetylene, and subsequently stripping the kerosene of monovinylacetylene with steam.

3. In a process for preparing acrylonitrile from hydrogene cyanide and acetylene, the steps comprising scrubbing monovinylacetylene from acetylene-rich recycle gas with kerosene in an absorption tower operating at a temperature between 0 and +15° C. and atmospheric pressure, flashing the spent kerosene at low temperature and a pressure below that of the absorber to recover a major portion of the dissolved acetylene, and subsequently stripping the kerosene of monovinylacetylene with steam.

4. In a process for preparing acrylonitrile from hydrogen cyanide and acetylene, the steps comprising scrubbing monovinylacetylene from acetylene-rich recycle gas with kerosene, flashing the spent kerosene at low temperature and a pressure below that of the absorber in a long tube evaporator to recover a major portion of the dissolved acetylene, and subsequently stripping the kerosene of monovinylacetylene with steam.

5. In a process for preparing acrylonitrile from hydrogen cyanide and acetylene, the steps comprising scrubbing acetylene-rich recycle gas with kerosene, passing the spent kerosene through a flash distillation unit thereby recovering acetylene therefrom, and subsequently steam distilling the kerosene to strip monovinylacetylene therefrom.

References Cited in the file of this patent
UNITED STATES PATENTS

| 2,180,496 | Balcar | Nov. 21, 1939 |
| 2,762,453 | Alexander | Sept. 11, 1956 |
| 2,773,560 | Kohl et al. | Dec. 11, 1956 |